No. 729,392. PATENTED MAY 26, 1903.
A. NEWELL.
MEANS FOR JOINING MECHANICAL MEMBERS.
APPLICATION FILED JUNE 19, 1902.
NO MODEL.
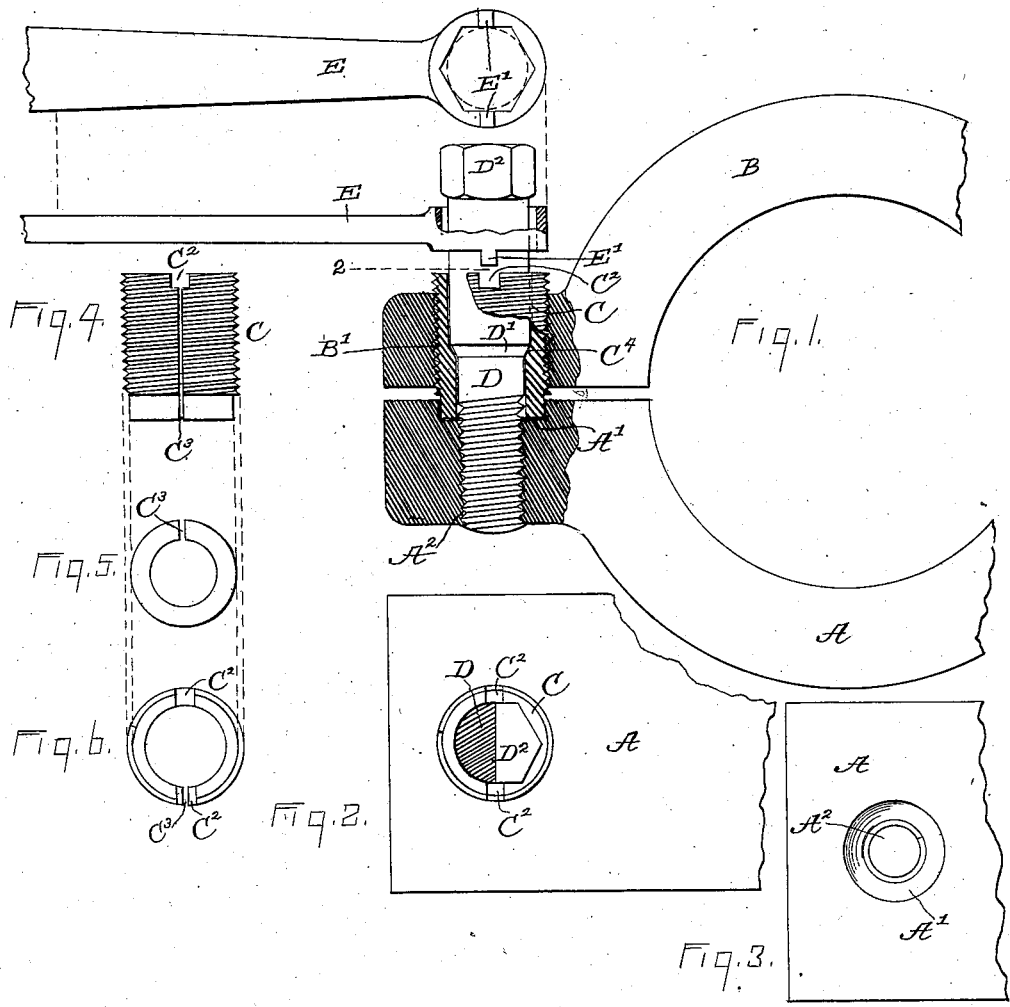

No. 729,392. Patented May 26, 1903.

UNITED STATES PATENT OFFICE.

AUGUSTUS NEWELL, OF PASADENA, CALIFORNIA.

MEANS FOR JOINING MECHANICAL MEMBERS.

SPECIFICATION forming part of Letters Patent No. 729,392, dated May 26, 1903.

Application filed June 19, 1902. Serial No. 112,291. (No model.)

*To all whom it may concern:*

Be it known that I, AUGUSTUS NEWELL, a citizen of the United States, residing at Pasadena, in the county of Los Angeles and State of California, have invented a new and useful Improvement in Means for Joining Mechanical Members, of which the following is a specification, reference being had to the accompanying drawings.

The object of my invention is to provide means for joining or coupling two mechanical members at varying distances from each other.

My improvement is adapted to use in a large number of mechanical devices. One of its uses is in connection with the bearings for journals.

The construction herein disclosed is a modification of the construction made the subject-matter of Letters Patent of the United States, No. 644,366, granted to me February 27, 1900.

In the accompanying drawings, Figure 1 is a sectional elevation of one end of the journal-bearing to which my improvement is applied. Fig. 2 is a plan and partial section of the structure shown by Fig. 1, the wrench having been removed and the view being in section on the line 2 from the left to the center of the screw-bolt. Fig. 3 is a plan of the left-hand portion of the lower member of the bearing, the connecting mechanism having been removed. Fig. 4 is an elevation of the tubular screw. Fig. 5 is a bottom view of said screw. Fig. 6 is a top view of said screw. Fig. 7 is a bottom view of a wrench designed for operating my improved mechanism. Fig. 8 is a side elevation of said wrench.

Referring to said drawings, A is the left-hand portion of the lower member of the journal-bearing. B is the upper member of said bearing. My improvement is applied to these members in such manner as to permit moving said members toward and from each other and securing them firmly at any desired distance from each other. The member A has in its upper face the circular cavity A', extending a short distance into said member. Axially in line with said cavity and of smaller diameter is the threaded aperture A², extending from the bottom of said cavity downward into and preferably through said member. A tubular screw C is threaded into an aperture B' in the member B, axially in line with the axis of said aperture A² and the cavity A', the lower end of said tubular screw resting rotatably in the cavity A' and adapted to bear upon the bottom of said cavity. The lower portion of said tubular screw is preferably provided with a smooth exterior fitting neatly into the cavity A'. The upper end of said tubular screw is provided with notches C² for the reception of lugs E' on the wrench E. If so desired, said tubular screw may have at one side a longitudinal slot C³. The interior of said screw is preferably of two diameters, the lower portion being of the lesser diameter, whereby an upward-directed annular shoulder or seat C⁴ is formed. The approach of the member B toward the member A is limited by the position of said tubular screw in said aperture B'. Turning said screw forward causes said screw to project farther through the member B and lift the latter away from the member A. Turning said screw backward raises said screw through said member B and allows the latter to descend toward the member A.

D is a set-bolt. Said bolt and the tubular screw C constitute a binding device for binding the members A and B to each other when their separation has been fixed by the tubular screw. The lower portion of said set-bolt is small enough in diameter to extend through the lower portion of said tubular screw, and it is threaded to fit into the threaded aperture A² in the member A. The upper portion of said set-bolt is preferably of proper diameter to fill the space within the upper portion of the tubular screw and has a downward-directed shoulder D' bearing downward upon the seat C⁴ of the tubular screw for limiting the movement of said bolt through said tubular screw. The set-bolt has a polygonal head D². The body of said bolt is extended a sufficient distance above the tubular screw to leave a space between said screw and said head high enough to receive a wrench E when the latter has been moved downward around said head, below the latter. The cross-section of said polygonal head is such as to permit it to be inscribed about a circle equal to the upper portion of the interior of said tubular screw, to the end that a wrench having a polygonal opening conforming to the cross-section of said head and adapted to surround and engage said head may also be moved downward around said head, below the latter, to rest upon the upper end of said tubular screw and have its lugs E' drop into the notches C² and turn said tubular screw without turning said set-bolt. In other words, said polygonal head is as large as the adjacent portion of said bolt and at the same time smaller than the upper end of said tubular screw, so that a wrench adapted to fit around said head may be moved downward around the adjacent portion of said bolt and engage the upper end of said tubular screw.

When the tubular screw has been set so as to establish the proper distance between the members A and B, the set-bolt is driven downward until it is tight, the shoulder D' bearing upon the seat C⁴, thereby drawing the member B downward and the threaded portion of the set-bolt drawing the member A upward against the lower end of the tubular screw.

The downward pressure of the set-bolt upon the seat C⁴ tends to expand the tubular screw C and form a binding engagement between the tubular screw and the aperture B', which tends to prevent the accidental rotation of said tubular screw, and between said screw and the lateral wall of the cavity A', whereby the more certain provision is made for preventing lateral movement of one member upon the other.

In my above-mentioned patent the upper end of the tubular screw is of polygonal form, and only the head of the set-bolt extends above said tubular screw, and said head and tubular screw require wrenches of different sizes, and in said patent the lower end of said tubular screw rests upon the upper face of the lower member of the journal-bearing and is free to shift laterally upon said face, so that said tubular screw does not aid, excepting by the binding of its lower end upon said member, in keeping said members from shifting laterally upon each other. To prevent such shifting, the opposing faces of said members are ribbed and channeled. In my improved construction herein described the lower end of the tubular screw makes an engagement with the lower member, by which horizontal shifting in any direction is prevented. This construction is simple, economical, and effective. While the upper and lower members are clamped together in a machine for boring the aperture B' through the upper member, the operation of the same tool is continued to form the cavity A'. The channeling and planing of the faces of the members A and B, a relatively expensive task, is then unnecessary, and movement of said member in any direction in the plane to which said screw is perpendicular is prevented.

The lug E³ on the wrench is of proper diameter to enter the upper end of the tubular screw when the screw-bolt D is not within said tubular screw, and the lugs E² are of proper size and form to rest in the notches C². The end of the wrench bearing said lugs is designed to be used for turning the tubular screw before the screw-bolt is inserted. It is intended that said wrench shall be manufactured and sold with said tubular screw and said screw-bolt.

I claim as my invention—

1. As an article of manufacture, a binding device consisting of the tubular screw, C, exteriorly threaded and formed at its upper end for engagement with a wrench, and the set-bolt, D, extending through said tubular screw, said set-bolt and said screw being provided with means for engaging each other to limit the passage of said bolt through said screw, and said set-bolt having a head located above the upper end of said tubular screw a distance at least equal to the thickness of a wrench, and said head being as large as the adjacent portion of said bolt and smaller than the upper end of said tubular screw, substantially as described.

2. As an article of manufacture, a binding device consisting of the tubular screw, C, exteriorly threaded and formed at its upper end for engagement with a wrench, and the set-bolt, D, extending through said tubular screw, said set-bolt and said screw being provided with a seat and shoulder to limit the passage of said bolt through said screw, and said set-bolt having a head located above the upper end of said tubular screw a distance at least equal to the thickness of a wrench, and said head being as large as the adjacent portion of said bolt and smaller than the upper end of said tubular screw, substantially as described.

3. As an article of manufacture, a binding device consisting of the tubular screw, C, exteriorly threaded and notched at its upper end for engagement with a wrench, and the set-bolt, D, extending through said tubular screw, said set-bolt and said screw being provided with means for engaging each other to limit the passage of said bolt through said screw, and said set-bolt having a head located above the upper end of said tubular screw a distance at least equal to the thickness of a wrench, and said head being as large as the adjacent portion of said bolt and smaller than the upper end of said tubular screw, substantially as described.

4. The combination of a member, A, having a threaded aperture, A², and a cavity, A', axially in line with said aperture, a member, B, having a threaded aperture larger than the aperture, A², and axially in line with the latter, a tubular screw threaded into the aperture in said member, B, and extending into said cavity, A', and a set-bolt extending through said tubular screw and threaded into said aperture, A², said tubular screw and said set-bolt being provided with means for engaging each other to limit the passage of said bolt through said screw, substantially as described.

5. The combination of a member, A, having a threaded aperture, $A^2$, and a cavity, $A'$, axially in line with said aperture, a member, B, having a threaded aperture larger than the aperture, $A^2$, and axially in line with the latter, a tubular screw threaded into the aperture in said member, B, and extending into said cavity, $A'$, and a set-bolt extending through said tubular screw and threaded into said aperture, $A^2$, said tubular screw and said set-bolt being provided with a seat and shoulder, substantially as described.

6. The combination of a member, A, having a threaded aperture, $A^2$, a member, B, having a larger threaded aperture axially in line with said aperture, $A^2$, a tubular screw threaded into said larger aperture and suitably formed at its upper end for making engagement with a wrench, a set-bolt extending through said tubular screw and threaded into the aperture in said member, A, and having at a distance above the upper end of said tubular screw a polygonal head as large as the adjacent portion of the body of said bolt and smaller than the upper end of said tubular screw, substantially as described.

In testimony whereof I have signed my name, in presence of two witnesses, this 6th day of June, in the year 1902.

AUGUSTUS NEWELL.

Witnesses:
J. H. WOODWORTH,
G. B. CHANDLER.